United States Patent
Pagnano et al.

(10) Patent No.: US 7,110,843 B2
(45) Date of Patent: Sep. 19, 2006

(54) ARRANGEMENTS AND METHODS FOR MONITORING PROCESSES AND DEVICES USING A WEB SERVICE

(75) Inventors: Marco Aurelio de Oliveira Pagnano, Sertaozinho (BR); Alexandre Calura Yamasita, Ribeirao Preto (BR)

(73) Assignee: Smar Research Corporation, Holbrook, NY (US)

( * ) Notice: Subject to any disclaimer, the term of this patent is extended or adjusted under 35 U.S.C. 154(b) by 358 days.

(21) Appl. No.: 10/373,552

(22) Filed: Feb. 24, 2003

(65) Prior Publication Data

US 2004/0167750 A1  Aug. 26, 2004

(51) Int. Cl.
*G06F 19/00* (2006.01)

(52) U.S. Cl. .................. 700/108; 700/79; 702/182; 702/188

(58) Field of Classification Search .......... 700/79, 700/108; 702/182, 184, 188; 703/13
See application file for complete search history.

(56) References Cited

U.S. PATENT DOCUMENTS

| | | | |
|---|---|---|---|
| 5,103,409 A | 4/1992 | Shimizu et al. | |
| 5,521,848 A | 5/1996 | Bayne et al. | |
| 5,571,007 A | 11/1996 | Ishiguro et al. | |
| 5,841,654 A | 11/1998 | Verissimo et al. | |
| 5,854,994 A | 12/1998 | Canada et al. | |
| 5,867,809 A | 2/1999 | Soga et al. | |
| 5,903,455 A | 5/1999 | Sharpe et al. | |
| 5,926,176 A | 7/1999 | McMillan et al. | |
| 5,960,214 A | 9/1999 | Sharpe, Jr. et al. | |
| 5,971,581 A | 10/1999 | Gretta et al. | |
| 5,995,916 A | 11/1999 | Nixon et al. ............. 702/182 |
| 6,006,171 A | 12/1999 | Vines et al. | |
| 6,094,600 A | 7/2000 | Sharpe, Jr. et al. | |
| 6,098,891 A * | 8/2000 | Guthery et al. ............. 235/492 |
| 6,112,246 A | 8/2000 | Horbal et al. | |
| 6,157,943 A | 12/2000 | Meyer | |
| 6,208,247 B1 | 3/2001 | Agre et al. | |
| 6,223,190 B1 | 4/2001 | Aihara et al. | |
| 6,298,454 B1 | 10/2001 | Schleiss et al. ............. 714/37 |
| 6,326,758 B1 | 12/2001 | Discenzo | |
| 6,330,517 B1 | 12/2001 | Dobrowski et al. | |
| 6,347,307 B1 | 2/2002 | Sandhu et al. | |
| 6,363,398 B1 | 3/2002 | Andersen ............. 707/103 |
| 6,370,448 B1 * | 4/2002 | Eryurek ............. 700/282 |
| 6,377,859 B1 * | 4/2002 | Brown et al. ............. 700/79 |
| 6,424,930 B1 | 7/2002 | Wood | |

(Continued)

FOREIGN PATENT DOCUMENTS

EP  1215589  6/2002

OTHER PUBLICATIONS

Sun Microsystems, Inc., Replacement Smart Card Reader for SunBlade Systems, Jun. 2002.*

(Continued)

*Primary Examiner*—Albert W. Paladini
*Assistant Examiner*—Sheela S. Rao
(74) *Attorney, Agent, or Firm*—Dorsey & Whitney LLP

(57) ABSTRACT

An arrangement, storage medium, and method are provided for accessing monitoring data from a storage arrangement of a processing system using a Web Service, in which the monitoring data is associated with a field device. For example, the monitoring data may be in an Extensible Markup Language ("XML") format, and a Simple Object Access Protocol can be used to access a particular portion of the monitoring data from the database. Moreover, based on the monitoring data, the field device can be replaced before problems arise therewith.

43 Claims, 9 Drawing Sheets

U.S. PATENT DOCUMENTS

| | | | |
|---|---|---|---|
| 6,434,512 | B1 | 8/2002 | Discenzo |
| 6,446,202 | B1 | 9/2002 | Krivoshein et al. |
| 6,490,543 | B1 | 12/2002 | Jaw |
| 6,505,086 | B1 | 1/2003 | Dodd et al. |
| 6,631,298 | B1 | 10/2003 | Pagnano et al. |
| 6,684,339 | B1 * | 1/2004 | Willig .................. 713/300 |
| 6,697,805 | B1 | 2/2004 | Choquier et al. |
| 6,725,182 | B1 | 4/2004 | Pagnano et al. |
| 2002/0080938 | A1 | 6/2002 | Alexander et al. |
| 2002/0083172 | A1 | 6/2002 | Knowles et al. |
| 2002/0143421 | A1 | 10/2002 | Wetzer |
| 2002/0169514 | A1 | 11/2002 | Eryurek et al. |
| 2002/0178126 | A1 | 11/2002 | Beck et al. |
| 2003/0005486 | A1 | 1/2003 | Ridolfo et al. |
| 2003/0028269 | A1 | 2/2003 | Spriggs et al. |
| 2003/0046366 | A1 | 3/2003 | Pardikar et al. |
| 2003/0050942 | A1 | 3/2003 | Ruellan et al. |
| 2004/0024813 | A1 | 2/2004 | Pagnano |
| 2004/0103144 | A1 | 5/2004 | Sallam et al. |
| 2004/0117166 | A1 * | 6/2004 | Cassiolato .................. 703/13 |
| 2004/0136027 | A1 | 7/2004 | Zehler |
| 2004/0210878 | A1 | 10/2004 | Pagnano |
| 2004/0230582 | A1 | 11/2004 | Pagnano |
| 2005/0007249 | A1 | 1/2005 | Eryurek et al. |

OTHER PUBLICATIONS

Mary Kirtland, "*A Platform for Web Services,*" Microsoft Developer Network, Jan. 2001.

U.S. Appl. No. 10/413,959, filed Apr. 15, 2003.

U.S. Appl. No. 10/436,956, filed May 13, 2003.

PROFIBUS International: "PROFIBUS Technical Overview".

Automation Tech. Products: "Field Device Tool FDT".

Industrial Automation Insider: "PROFIBUS Offers FDT Spec to Other Fieldbuses," vol. 6, No. 1 Jan. 2002.

Allen, C of Fisher-Rosemount, "Intelligent Values & Actuators", I.E.E. Conference, Dec. 21, 1994.

Castro, Elizabeth, "XML For the World Wide Web," 2001, Peachpit Press, pp. 17 and 135.

Mario Thron: "XML-Technology of bus-linked components" in Description Methods for Functions and Devices (Abstract).

Mario Thron Code Generation by XML-Device Description (Abstract), Jun. 2001 to Jul. 2002.

\* cited by examiner

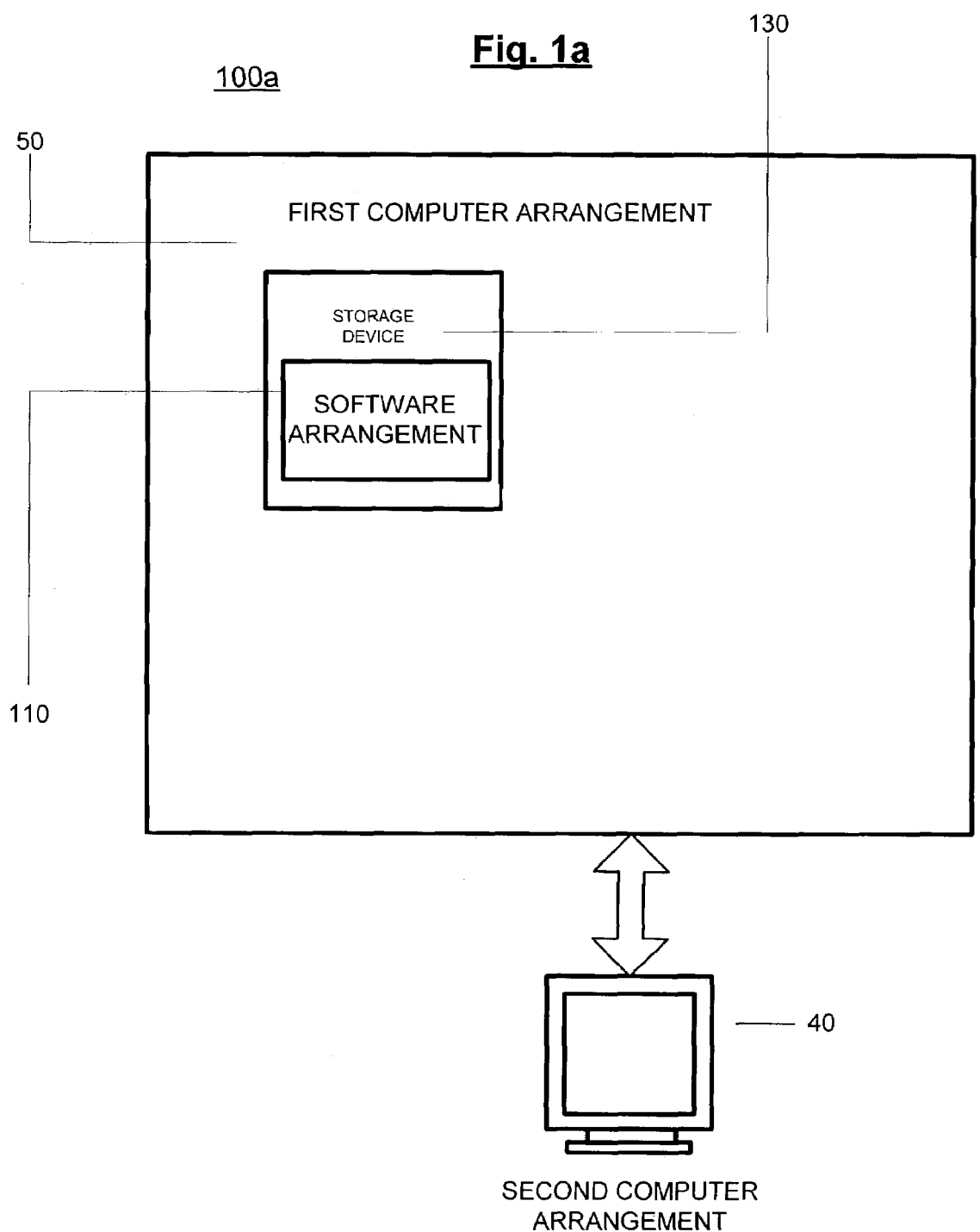

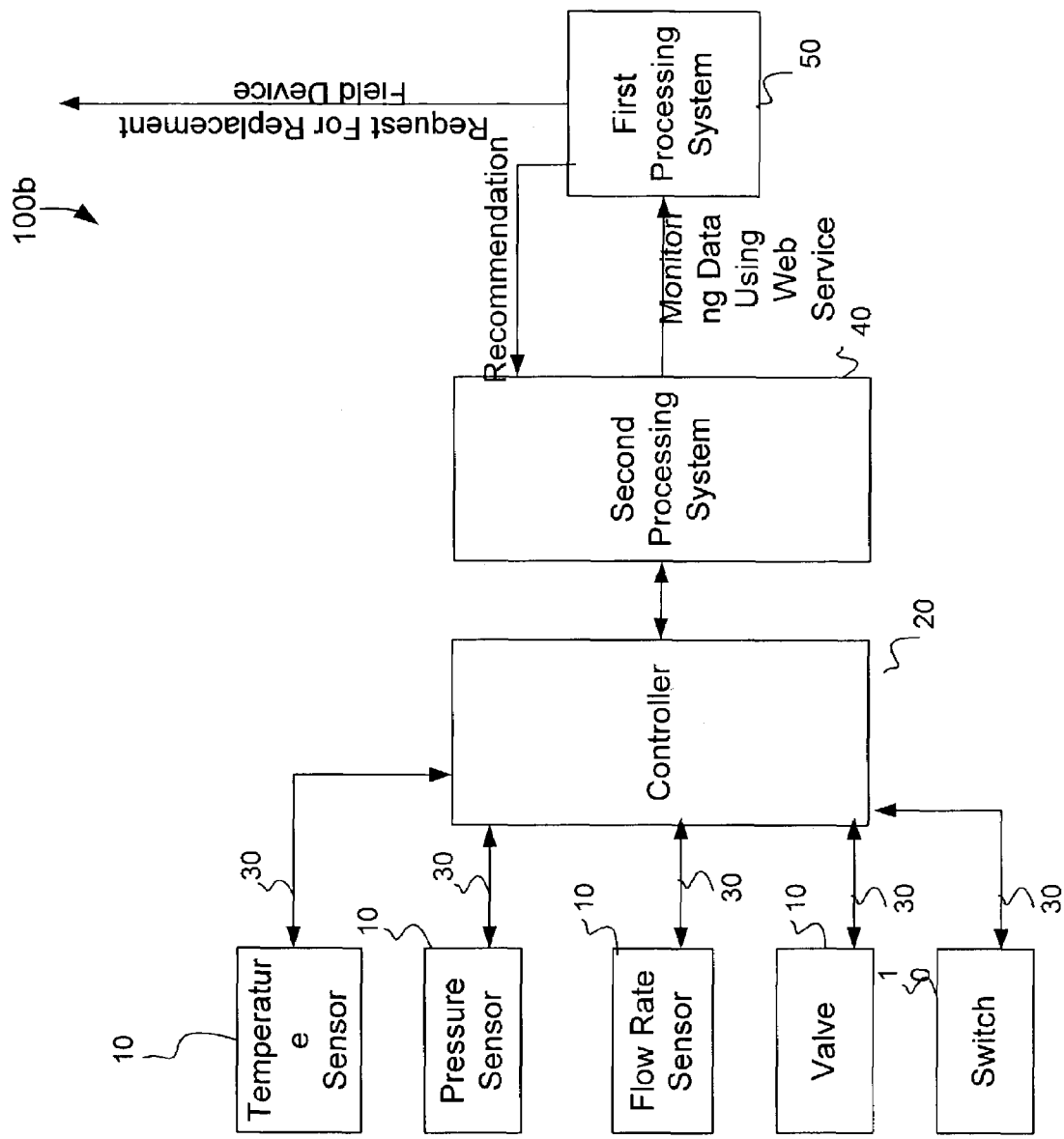

ARRANGEMENTS AND METHODS FOR MONITORING PROCESSES AND DEVICES USING A WEB SERVICE

FIELD OF THE INVENTION

The present invention relates generally to arrangements and methods for monitoring processes and devices using a Web Service. In particular, the invention is directed to the arrangement and method in which devices are maintained and/or replaced based on monitoring data obtained using the Web Service.

BACKGROUND OF THE INVENTION

Conventional monitoring arrangements may include a plurality of field devices (e.g., smart field devices), positioned at various locations on a network. The smart field devices may include a processor, and can be temperature sensors, pressure sensors, flow rate sensors, valves, switches, etc., or combinations thereof. The smart field devices may be communicatively coupled to each other using an open smart communications protocol. Such open smart communications protocols may include HART®, PROFIBUS®, FOUNDATION® Fieldbus, etc. These open smart communications protocol enable smart field devices that are manufactured by different manufactures to be used together in the same process. The conventional arrangements also may include a controller communicatively coupled to each of the smart field devices using the open smart communications protocol. Moreover the controller may include a processor, and can receive data from each of the smart field devices.

In operation, each smart field device may perform a particular function within the arrangement. For example, a temperature sensor may measure a temperature of a liquid, a pressure sensor may measure pressure within a container, a flow rate sensor may measure a flow rate of the liquid, etc. Similarly, valves and switches may open to allow or increase the flow of the liquid, or may close to stop the flow of the liquid or to decrease the flow rate of the liquid. After the smart field devices obtain measurements of various process parameters, or the valves or switches are opened/closed, the smart field devices may communicate with the controller. For example, the smart field devices may forward the data to the controller, and the controller can implement a control procedure based on the received data.

Moreover, the smart field devices and/or the controller may be adapted or operable to detect existing problems associated with the smart field devices. For example, the smart field device can measure instantaneous temperatures and/or instantaneous flow rates of a fluid, and may store the temperatures and flow rates in a database. The smart field devices can also continuously calculate an average fluid temperature or an average fluid flow rate, and compare the most recently measured temperature or flow rate to the average fluid temperature or flow rate, respectively. When the efficiency of the smart field device decreases, the most recently measured temperature or flow rate may be substantially less than or greater than the average temperature or flow rate, respectively. When the smart field device detects this deviation, it forwards the data to the controller, and the controller reports the existence of the problem to a receiving processing system. Subsequently, the smart field device may be replaced and/or maintenance can be performed on the smart field device.

Nevertheless, such systems only depend on the data associated with the performance of the smart field device to determine whether to replace or perform maintenance on the smart field device. Consequently, problems with the smart field device may arise before the maintenance is performed on the smart field device and/or before the smart field device is replaced. Moreover, in order to access the data associated with the performance of the smart field device, certain programming language and/or particular platform used by the receiving processing system can be the same as the programing language and/or the platform used by a processing system which is accessing the data.

SUMMARY OF THE INVENTION

Therefore, a need has arisen to provide an arrangement and method for monitoring devices and processes which overcome the above-described and other shortcomings of the prior art.

One of the advantages of the present invention is that monitoring data associated with the field device can be obtained by the processing system using a Web Service. As such, the processing system which accesses the monitoring data can determine whether to replace the field device or perform maintenance on the field device. Moreover, because this processing system uses the Web Service to access the monitoring data, the programing language and/or the platform used by this processing system need not be the same as the programing language and/or the platform used by another accessed processing system.

This and other advantages can be achieved with an exemplary embodiment of the arrangement and method according to the present invention. In particular, a first processing system can access monitoring data from a database of a second processing system using a Web Service, in which the monitoring data is associated with a field device (e.g., a temperature sensor, a pressure sensor, a flow rate sensor, a valve, and/or a switch). For example, the monitoring data can be in an Extensible Markup Language ("XML") format, and the first processing system can use a Simple Object Access Protocol ("SOAP") to access a particular portion of the monitoring data from the database. Moreover, the first processing system may transmit a request to replace the field device and/or a recommendation for maintenance to be performed on the field device based on the monitoring data.

For example, the monitoring data may include the amount of time that the field device has been in operation, and the first processing system may transmit the request to replace the field device when the amount of time that the field device has been in operation is greater than a predetermined amount of time. In another example, the field device can be communicatively coupled to a controller, and the controller can communicatively coupled to the second processing system. In this example, the monitoring data may include information associated with a measurement performed by the field device (e.g., a temperature, a pressure, and/or a flow rate), a position of the valve, and/or a position of the switch at a plurality of times during an operation of the field device. Moreover, the controller and/or the field device can compare an instantaneous temperature with an average temperature, an instantaneous pressure with an average pressure, and/or an instantaneous flow rate with an average flow rate. The controller and/or the field device can also transmit the monitoring data to the second processing system when a difference between the instantaneous temperature and the average temperature, the instantaneous pressure and the average pressure, and/or the instantaneous flow rate and the average flow rate is greater than a predetermined threshold. The first processing system can then access the database of the second processing system, and transmit a request to repair and/or replace the field device based on a performance of the field device.

In another embodiment of the present invention, the field device may be a smart field device, and the controller can communicate with the smart field device using an open smart communications protocol. For example, the open smart communications protocol can be a Foundation Fieldbus® protocol, a PROFIBUS® protocol, etc.

In a logic arrangement, a storage medium, and/or a software arrangement according to another embodiment of the present invention, the first processing system can access monitoring data from a database of the second processing system using the Web Service, in which the monitoring data is associated with the field device (e.g., a temperature sensor, a pressure sensor, a flow rate sensor, a valve, and/or a switch). For example, the monitoring data can have an Extensible Markup Language ("XML") format, and the first processing system can use Simple Object Access Protocol ("SOAP") to access at least one particular portion of the monitoring data from the database. Moreover, the first processing system may transmit a request to replace the field device and/or a recommendation for a maintenance to be performed on the field device based on the monitoring data.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

FIG. 1a is a schematic diagram of an exemplary embodiment of a system which includes a software arrangement according to the present invention for monitoring processes and devices using a Web Service.

FIG. 1b is a block diagram of a second exemplary embodiment of the arrangement according to the present invention for monitoring processes and devices using the Web Service.

FIG. 2b is an illustration of examples of monitoring data which may be transmitted to a controller by at least one field device using the exemplary method of FIG. 2a.

FIG. 3b is an illustration of examples of monitoring data which may be transmitted to the controller by the field device using the exemplary method of FIG. 3a.

DETAILED DESCRIPTION

Figure 1B:
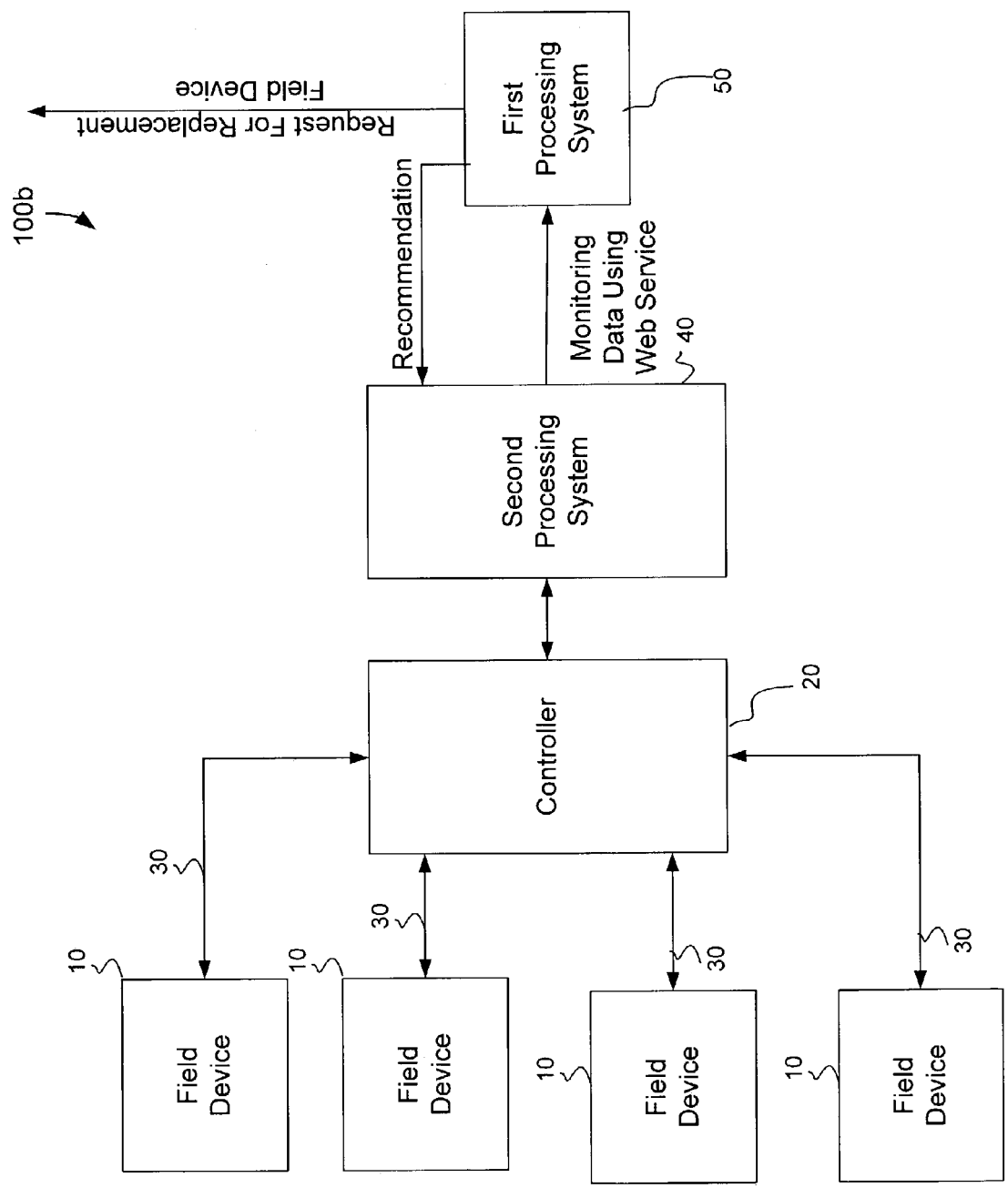
FIG. 1b is a block diagram of a first exemplary embodiment of an arrangement according to the present invention for monitoring processes and devices using the Web Service.

Exemplary embodiments of the present invention and their advantages may be understood by referring to FIGS. 1a–3b, like numerals being used for like corresponding parts in the various drawings.

FIG. 1a shows an exemplary embodiment of a system 100a which includes a storage device 130 (e.g., RAM, hard drive, CD-ROM, etc.) that stores thereon a software arrangement 110, and also has a first computer/processing system 50 (e.g., a microprocessor). This software arrangement 110 may be executed by the first computer/processing system 50 so as to access monitoring data from a database (e.g., an internal database or a remote database) of a second processing system 40 using a Web Service. In particular, the monitoring data is preferably associated with one or more field devices 10 (e.g., a smart field device, such as a temperature sensor, a pressure sensor, a flow rate sensor, a valve, and/or a switch. Moreover, the monitoring data can have an Extensible Markup Language ("XML") format, and the first processing system 50 may use a Simple Object Access Protocol to access a particular portion of the monitoring data from the database. Moreover, the first processing system 50 may transmit a request to replace the field device 10 and/or a recommendation for maintenance to be performed on the field device 10 based on the monitoring data. As indicated above, the software arrangement 110 may be resident on the storage device 130 (e.g., a memory device, a hard drive, a CD-ROM, etc.) of the first processing system 50, and/or can also be stored on an external storage device. Instead of using the software arrangement 110, it is possible to utilize a hardware arrangement, a firmware arrangement and/or a combination thereof.

Web Services that can be utilized by the systems, arrangements, and methods of the present invention are, e.g., programmable application logic that are accessible using standard Internet protocols. Unlike conventional component technologies, Web Services are generally not accessed via object-model-specific protocols, such as the Component Object Model, Remote Method Invocation, or Internet Inter-ORB Protocol. In contrast, the Web Services may be accessed via ubiquitous Web protocols and data formats, such as Hypertext Transfer Protocol ("HTP") and Extensible Markup Language ("XML"). Moreover, a Web Service interface may be defined in terms of messages which the Web Service accepts and generates, and a Web Service can be used by applications implemented in any language for any platform. In this manner, the Web Services may be platform-independent, language-independent, and reusable. Consequently, using the Web services, processing systems may communicate with each other independent from the programing language and/or the platform used by each processing system.

FIG. 1b shows a first exemplary embodiment of an arrangement 100b according to the present invention for monitoring processes and devices using such Web Service. The arrangement 100b may include the one or more field devices 10 provided on a network, and each field device 10 may include a processor (not shown). Referring to FIG. 1c, which shows second exemplary embodiment of the arrangement 100b according to the present invention, each of the smart field devices 10 may be a sensor, a control element, etc. The sensor may be a temperature sensor, a pressure sensor, a flow rate sensor, etc., and the control element can be a valve, a switch, etc. In operation, each of the field devices 10 may perform a function within the arrangement 10b. For example, a first field device 10 in FIG. 1c which is a temperature sensor may measure a temperature of a liquid, a second field device 10 which is a pressure sensor may measure pressure within a container, a third field device 10 which is a flow rate sensor may measure a flow rate of the liquid, etc. Similarly, fourth and fifth field devices 10 which can be a valve and a switch, respectively, may be opened to increase the flow rate of the liquid, or may be closed to stop the flow of the liquid or decrease the flow rate of the liquid. In an exemplary embodiment of the arrangement 100b according to the present invention, each field device 10 may be communicatively coupled to at least one other field device 10 using an open smart communications protocol 30. Such open smart communications protocols may be HART®, PROFIBUS®, FOUNDATION® Fieldbus, etc.

Referring again to FIG. 1b, the arrangement 100b also may include a controller 20. The controller 20 may have a processor (not shown), and can also be communicatively coupled to each field device 10 using the open smart communications protocol 30. The arrangement 100b may further include the second processing system 40 that is communicatively coupled to the controller 20. In an exemplary embodiment of the present invention, the second processing system 40 may be communicatively coupled to the controller 20 using an Ethernet connection. During operation, each of the smart field devices 10 may collect monitoring data associated with a function block of that particular field device 10. For example, in a case when the field device 10 is a sensor, the monitoring data may include values associated with instantaneous temperatures, pressures, flow rates, etc. detected by such field device 10 at various times. When the field device 10 is a control element, the monitoring rate may include values associated with a position of such field device 10 at various times. When the field device 10 is a sensor or a control element, the monitoring data may further include values associated with historical data, e.g., the amount of time that such field device 10 has been in operation. In any of the exemplary embodiments described herein, each field device 10 and/or the controller 20 can be adapted or operable to transmit the monitoring data to the second processing system 40, and the second processing system 40 may be adapted or operable to store the monitoring data in a database (e.g., an internal database or a remote database) or in another storage arrangement, such as a CD-ROM, memory, etc. Moreover, the stored monitoring data can be provided in an Extensible Markup Language ("XML") format.

For example, the controller 20 and/or the field device 10 may be adapted or operable to continuously calculate the average temperature, pressure, flow rate, etc., and to compare the most recently obtained instantaneous temperature, pressure, flow rate, etc. with the average temperatures pressure, flow rate, etc. respectively. The field device 10 and/or the controller 20 may also transmit the monitoring data to the second processing system 40 when the difference between the instantaneous temperature, pressure, flow rate, etc. and the average temperature, pressure, flow rate, etc. is greater than a predetermined temperature, pressure, flow rate, etc. differential, respectively. Similarly, when the amount of time that the field device 10 has been in operation exceeds a predetermined amount of time, such field device 10 and/or the controller 20 may transmit the monitoring data relating to the time of the operation of this field device 10 to the second processing system 40. The predetermined amount of time may be selected such that the field device 10 will preferably not experience a substantial decrease in the efficiency prior to the expiration of such predetermined amount of time. As such, the monitoring data may be transmitted to the second processing system 40 before the field device 10 experiences a decrease in efficiency. Such data transmission can be performed independently from, or in combination with, the operation of the field device 10.

In another embodiment of the present invention, the arrangement 100b may further include the first processing system 50 as shown in FIGS. 1b and 1c. The first processing system 50 can be communicatively coupled to the second processing system 40. In addition, the first processing system 50 may be adapted or operable to access the monitoring data stored in the second processing system 40 using the Web Service. For example, the first processing system 50 can use the Simple Object Access Protocol ("SOAP") to access at least one portion of the monitoring data from the database. Moreover, based on the monitoring data, the first processing system 50 may also be adapted or operable to transmit a recommendation for maintenance to be performed on such field device 10 or for that field device 10 to be replaced. Similarly, the first processing system 50 can transmit a request to the manufacturer of the monitored field device 10 requiring the delivery or installation of a replacement field device 10.

For example, when the amount of time that the field device 10 has been in operation exceeds a predetermined amount value of time, the field device 10 and/or the controller 20 can transmit the monitoring data to the second processing system 40. Thereafter, a user (not shown) of the first processing system 50 can access the monitoring data stored in the second processing system 40 using the Web Service. The user of the first processing system 50 can also transmit a recommendation for the maintenance to be performed on the field device 10, transmit a recommendation for the field device 10 to be replaced, request the delivery or the installation of a replacement field device 10, or combinations thereof. Similarly, when the difference between the instantaneous temperature, pressure, flow rate, etc. and the average temperature, pressure, flow rate, etc. is greater than the predetermined temperature, pressure, flow rate, etc., respectively for a particular field device 10, such field device 10 and/or the controller 20, may transmit the monitoring data to the second processing system 40. Thereafter, the user of the first processing system 50 may access the monitoring data stored in the second processing system 40 using the Web Service. As described above, the predetermined amount of time may be selected such that the field device 10 will not experience a substantial decrease in efficiency prior to the expiration of the predetermined amount of time.

Figure 2A:
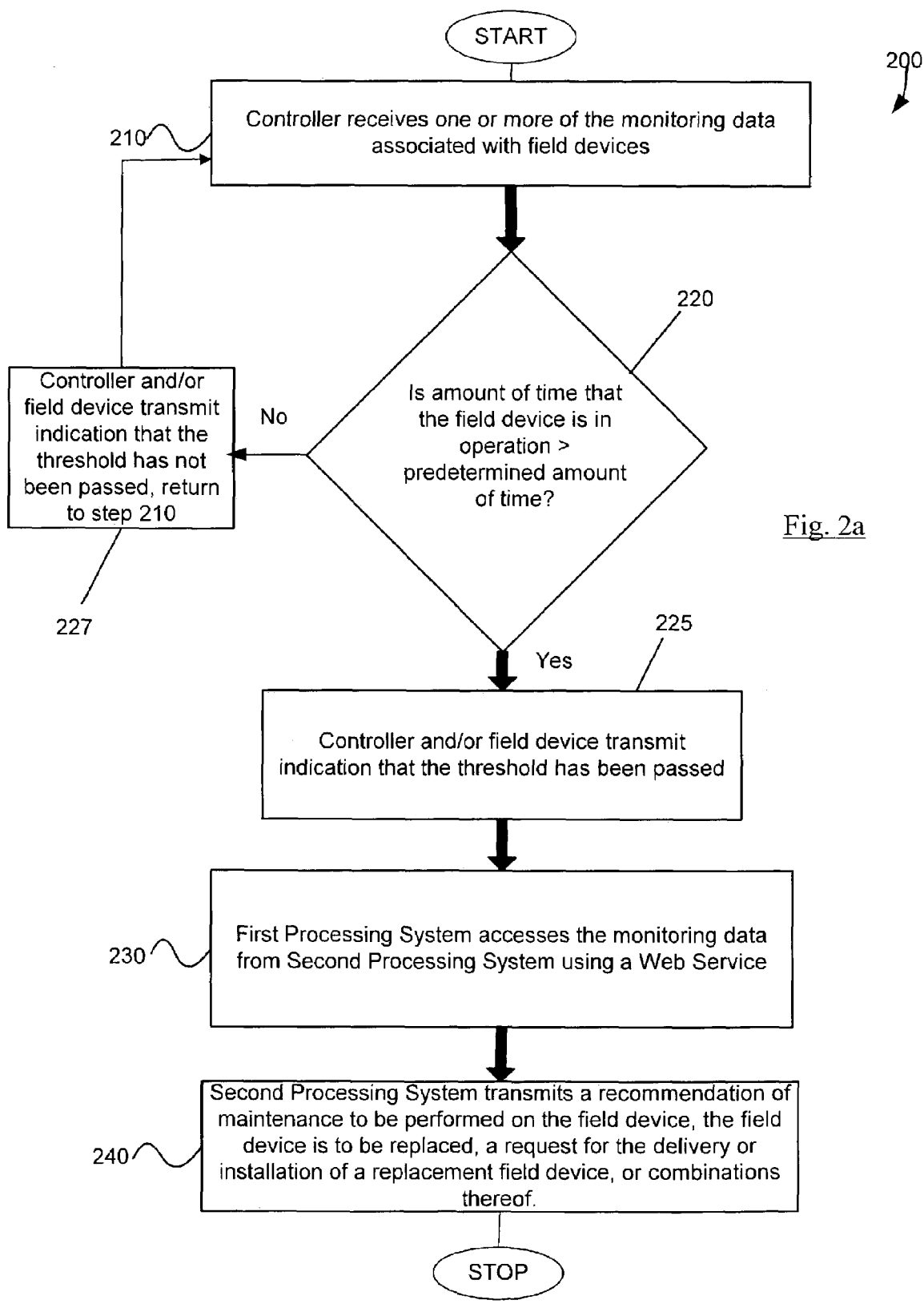
FIG. 2a is a flow diagram of a first exemplary embodiment of a method according to the present invention for monitoring processes and devices using the Web Service.
Figure 2B:
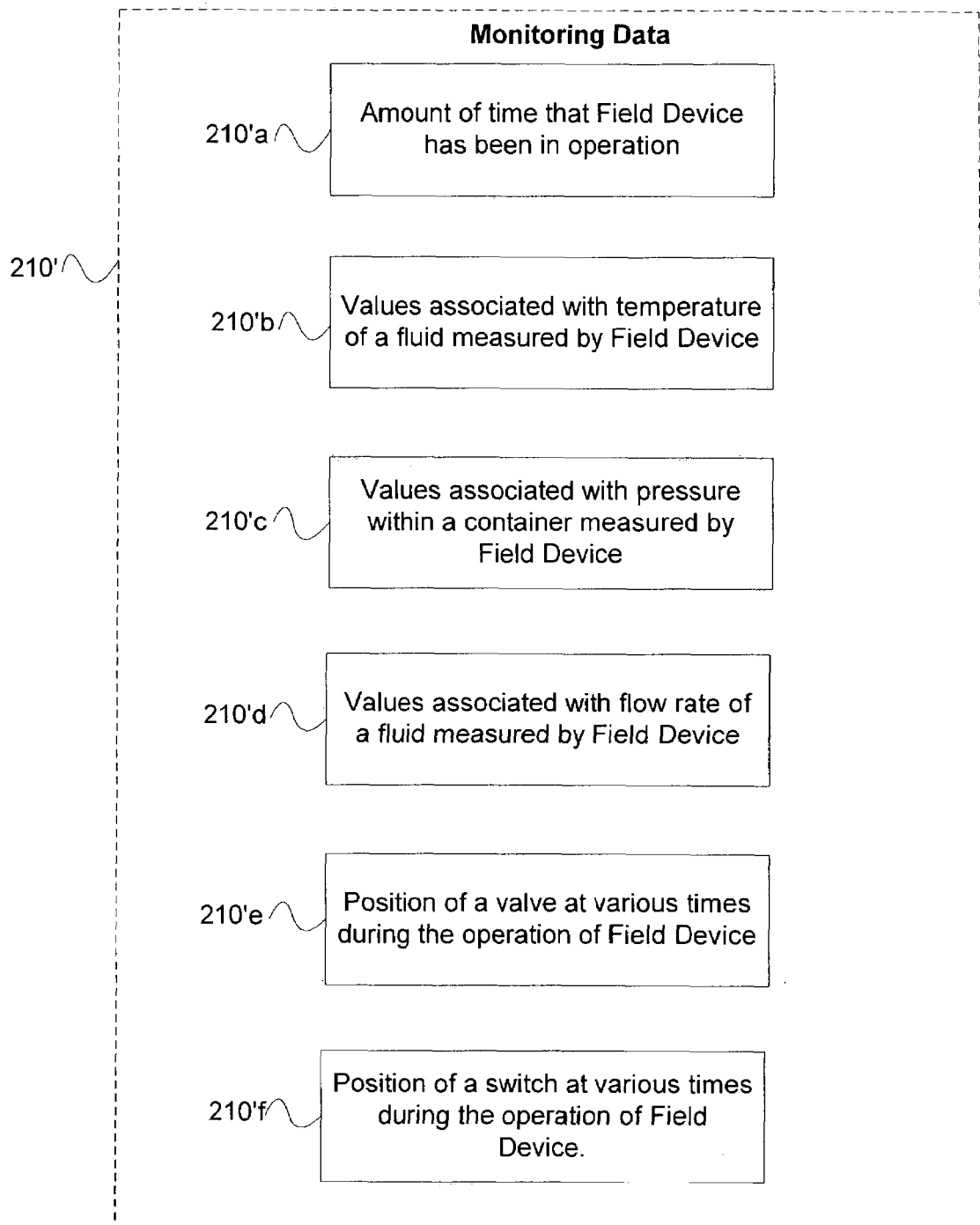

Referring to FIG. 2a, an exemplary embodiment of a method 200 according to the present invention is depicted which can be utilized by the system 100a of FIG. 1a and/or the arrangement 100b of FIGS. 1b and 1c. In step 210, the controller 20 may receive monitoring data 210' associated with one or more of the field devices 10. Referring to FIG. 2b, the monitoring data 210' can include any one or more, or a combination of monitoring data 210'a–210'f. For example, the monitoring data 210' can include any combination of the amount of time that the field device 10 has been in operation (block 210'a), values associated with a temperature of a fluid measured by the field device 10 (block 210'b), values associated with a pressure within a container measured by the field device 10 (block 210'c), values associated with a flow rate of a fluid measured by the field device 10 (block 210'd), a position of a valve at various times during the operation of the field device 10 (block 210'e), and a position of a switch at various times during the operation of the field device 10 (block 210'f). In step 220, the controller 20 and/or the field device 10 may determine whether the amount of time that the field device 10 has been in operation exceeds the predetermined amount of time. If that is the case, the controller 20 and/or the field device 10 may transmit the monitoring data 210' to the second processing system 40 (step 225). Alternatively, if in step 220 the controller 20 and/or the field device 10 determines that the predetermined amount of time has not been reached, the controller 20 and/or the field device 10 may transmit another indication that the threshold has not been reached in step 227, and the method 200 may return to step 210. In another exemplary embodiment shown in FIG. 2c, steps 220–227 may be replaced by steps 220'–227'. For example, in step 220', the controller 20 and/or the field device 10 may determine if a difference between the instantaneous temperature, pressure, flow rate, etc. and the average temperature, pressure, flow rate, etc. is greater than the predetermined temperature, pressure, flow rate, etc. differential, respectively. The indication of the determination is formulated by the field device and/or the controller (i.e., see steps 225' and 227').

Figure 2C:
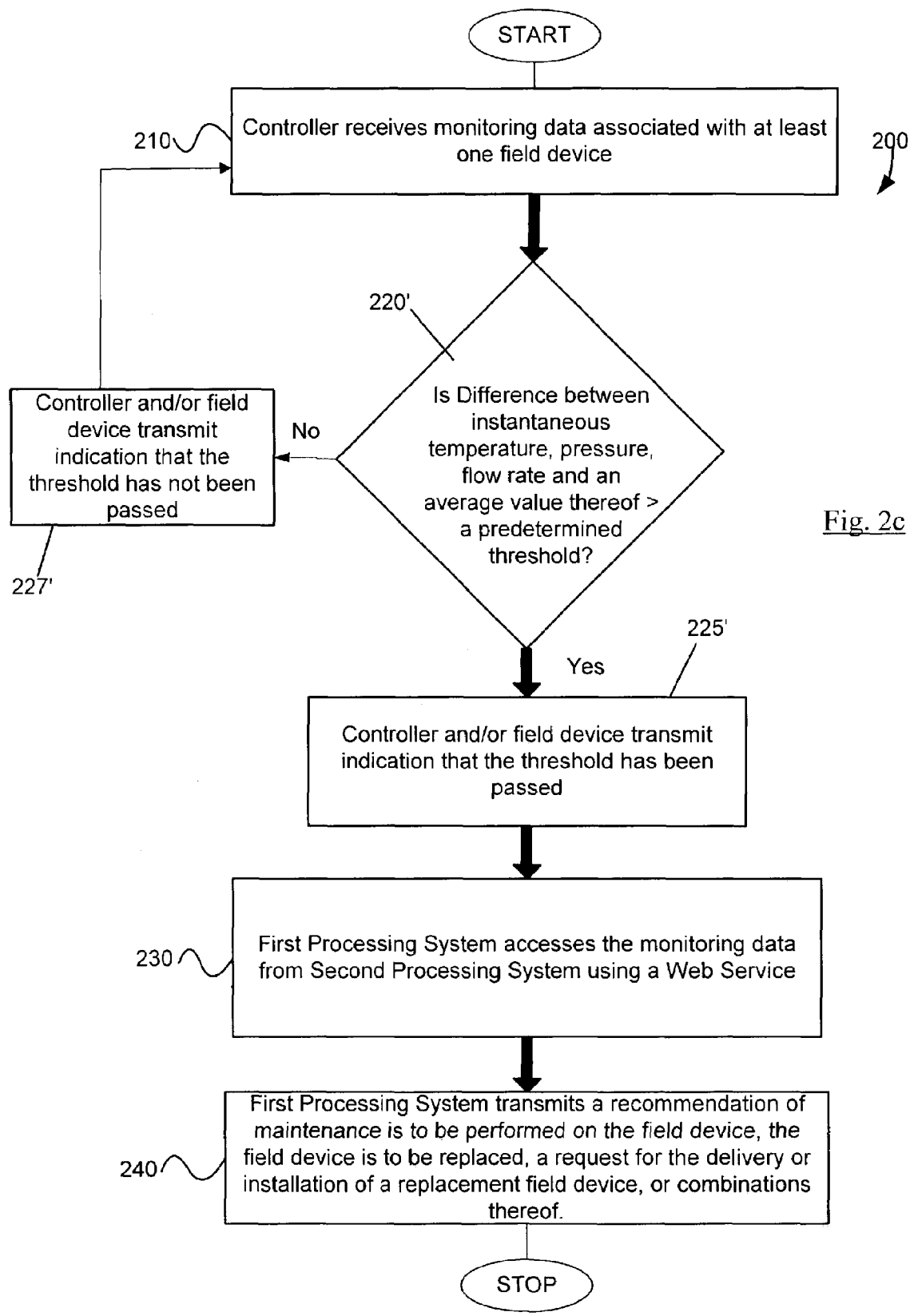
FIG. 2c is a flow diagram of a second exemplary embodiment of the method according to the present invention for monitoring processes and devices using the Web Service.
Figure 2D:
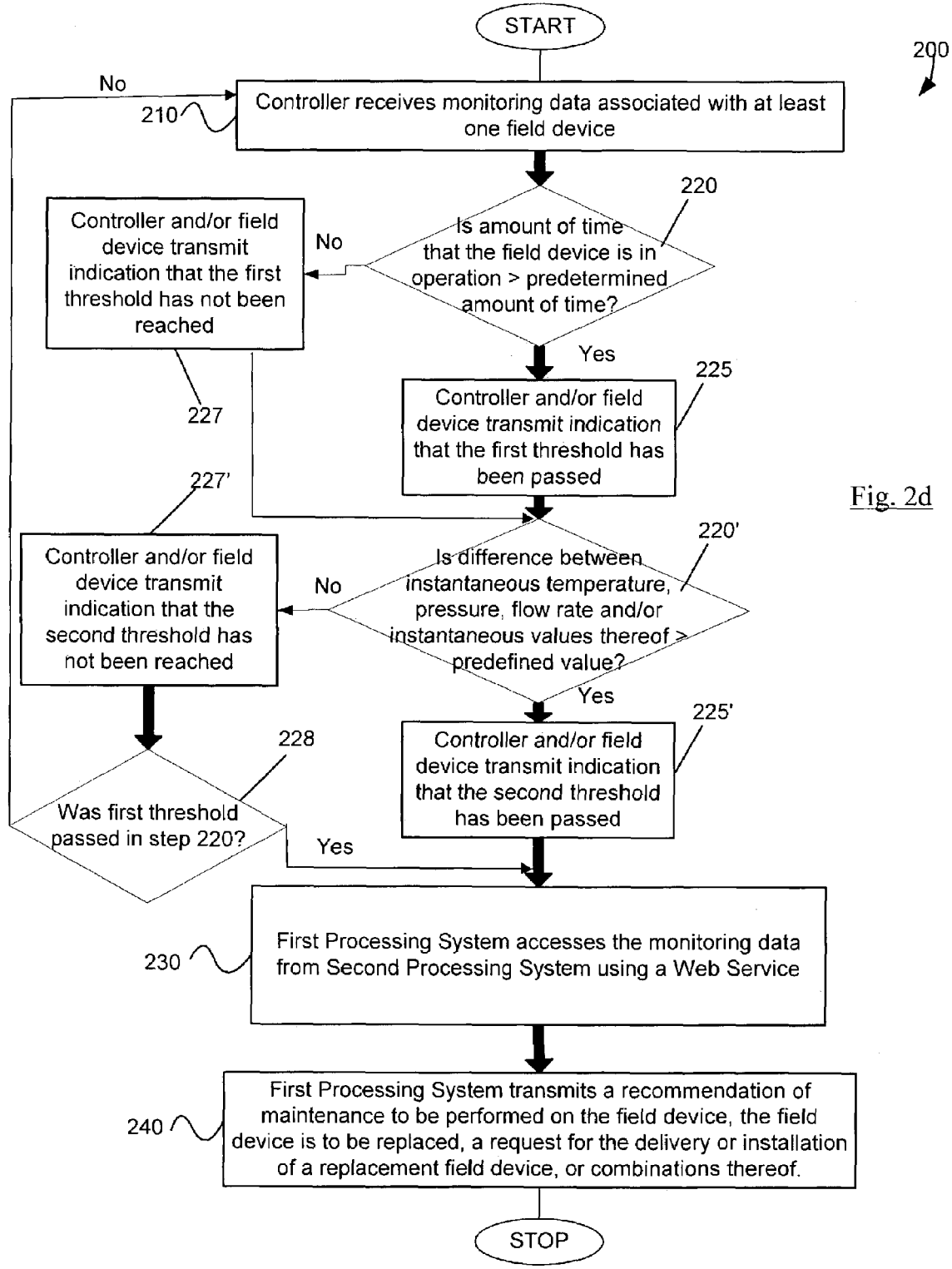
FIG. 2d is a flow diagram of a third exemplary embodiment of the method according to the present invention for monitoring processes and devices using the Web Service.

Moreover, in yet another exemplary embodiment shown in FIG. 2d, the method 200 may include steps 220–227 of FIG. 2a, steps 220'–227' of FIG. 2c, and an additional step 228. Specifically, in step 220, the controller 20 and/or the field device 10 may determine whether the amount of time that the field device 10 has been in operation exceeds the predetermined amount of time. For such case, the controller 20 and/or the field device 10 may transmit the monitoring data 210' to the second processing system 40 (step 225). However, if in step 220 the controller 20 and/or the field device 10 determines that the predetermined amount of time has not been reached, the controller 20 and/or the field device 10 may transmit another indication that the threshold has not been reached in step 227. Then, step 220', the controller 20 and/or the field device 10 may determine if a difference between the instantaneous temperature, pressure, flow rate, etc. and the average temperature, pressure, flow rate, etc. is greater than the predetermined temperature, pressure, flow rate, etc. differential, respectively. The indication of the determination is formulated by the field device and/or the controller (i.e. steps 225', 227'). If none of the above-described thresholds are reached, then in step 228, the method 200 returns to step 210.

In any of the described embodiments of the method 200, in step 230, the first processing system 50 may access the monitoring data from the second processing system 40 using the Web Service. Moreover, in step 240, the first processing system 50 may transmit a recommendation for maintenance to be performed on the field device 10, the field device 10 is to be replaced, a request for the delivery and/or the installation of a replacement field device 10 to be made, etc. As such, maintenance may be performed on the field device 10 and/or the field device 10 may be replaced.

Figure 3A:
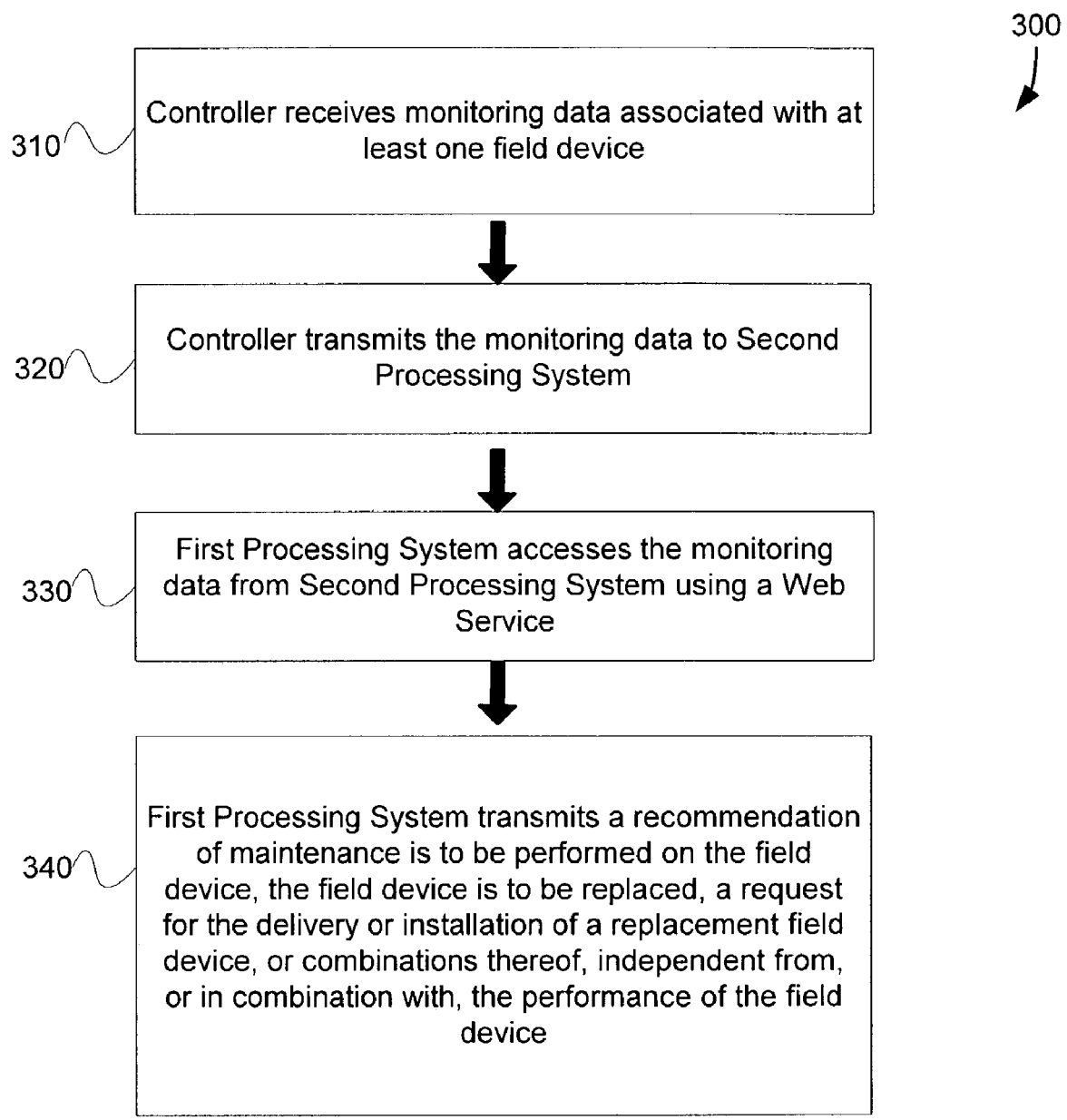
FIG. 3a is a flow diagram of a fourth exemplary embodiment of the method according to the present invention for monitoring processes and devices using the Web Service.
Figure 3B:
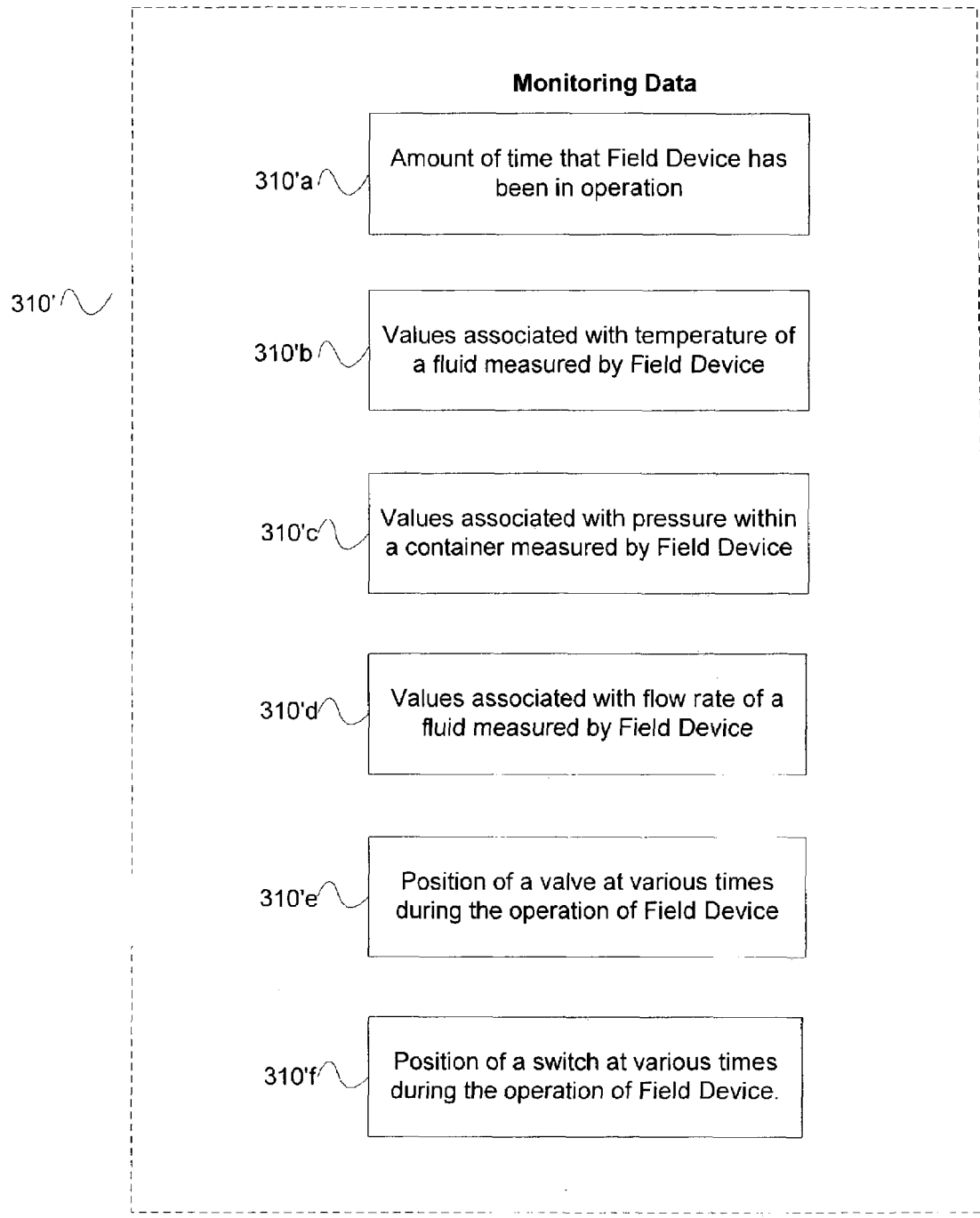

Referring to FIG. 3a, another exemplary embodiment of the method 300 according to the present invention can be used by the arrangement 100b of FIG. 1a is depicted. In step 310, the controller 20 may receive the monitoring data associated with the field device 10. Referring to FIG. 3b, in a variation of the method 300 of the present invention provided that the monitoring data can include any combination of monitoring data 310'a–310'f. For example, the monitoring data can include any combination of the amount of time that at least one field device 10 has been in operation (block 310'a), values associated with a temperature of a fluid measured by the field device 10 (block 310'b), values associated with a pressure within a container measured by the field device 10 (block 310'c), values associated with a flow rate of a fluid measured by the field device 10 (block 310'd), a position of a valve at various times during the operation of the field device 10 (block 310'e), and a position of a switch at various times during the operation of the field device 10 (bock 310'f). Referring back to FIG. 3a, in step 320, the controller 20 may transmit the monitoring data to the second processing system 40. In step 330, the first processing system 50 may access the monitoring data 310 from the second processing system 40 using the Web Service. Then, in step 340, the first processing system 50 can transmit a recommendation for the maintenance to be performed on the field device 10, for the field device 10 to be replaced, a request for the delivery or the installation of a replacement field device 10, or combinations thereof. For example, the first processing system 50 may transmit such recommendations and/or requests when the amount of time that the field device 10 has been in operation exceeds the predetermined amount of time. As such, maintenance may be performed on the field device 10, or the field device 10 may be replaced, independent from, or in combination with, the performance of the field device 10. Moreover, the first processing system 50 may access the monitoring data from the second processing system 40 regardless of the programming language and/or the platform used by the first processing system 50 and the second processing system 40.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims.

What is claimed is:

1. An arrangement, comprising:
   a first processing system operable to access monitoring data from a storage arrangement of a second processing system using a Web Service, wherein the monitoring data is associated with at least one field device.

2. The arrangement of claim 1, wherein the monitoring data is in an Extensible Markup Language (XML) format.

3. The arrangement of claim 2, wherein the first processing system is operable to use a Simple Object Access Protocol to access at least one particular portion of the monitoring data from the storage arrangement.

4. The arrangement of claim 1, wherein the first processing system is further operable to transmit at least one of a request to replace the at least one field device and a recommendation for a maintenance to be performed on the at least one field device based on the monitoring data.

5. The arrangement of claim 4, wherein the monitoring data includes information regarding an amount of time that the at least one field device has been in operation.

6. The arrangement of claim 5, wherein the first processing system transmits the request to replace the at least one field device when the amount of time that the at least one field device has been in operation is greater than a predetermined amount of time.

7. The arrangement of claim 4, wherein the at least one field device includes at least one of a temperature sensor, a pressure sensor, a flow rate sensor, a valve and a switch.

8. The arrangement of claim 7, wherein the monitoring data includes information associated with at least one measurement performed by the at least one field device, the at least one measurement including at least one of temperature, pressure and flow rate.

9. The arrangement of claim 8, wherein the at least one field device is communicatively coupled to a controller, and wherein the controller is communicatively coupled to the second processing system.

10. The arrangement of claim 9, wherein at least one of the controller and the at least one field device is operable to compare an instantaneous temperature to an average temperature, and to transmit the monitoring data to the second processing system when a difference between the instantaneous temperature and the average temperature is greater than a predetermined threshold.

11. The arrangement of claim 9, wherein at least one of the controller and the at least one field device is operable to compare an instantaneous pressure to an average pressure, and to transmit the monitoring data to the second processing system when a difference between the instantaneous pressure and the average pressure is greater than a predetermined threshold.

12. The arrangement of claim 9, wherein at least one of the controller and the at least one field device is operable to compare an instantaneous flow rate to an average flow rate, and to transmit the monitoring data to the second processing system when a difference between the instantaneous flow rate and the average flow rate is greater than a predetermined threshold.

13. The arrangement of claim 7, wherein the monitoring data includes at least one of a position of the valve and a position of the switch at a plurality of times during an operation of the at least one field device.

14. The arrangement of claim 1, wherein the at least one field device is at least one smart field device, and wherein a controller communicates with the at least one smart field device using an open smart communications protocol.

15. The arrangement of claim 14, wherein the open smart communications protocol is one of a Foundation Fieldbus® protocol and a PROFIBUS® protocol.

16. The arrangement of claim 1, wherein the storage arrangement is positioned remote from the second processing system.

17. A logic arrangement encoded on a computer-readable medium comprising instructions which, when executed by a first processing system, configure the first processing system to access monitoring data from a storage arrangement of a second processing system using a Web Service, wherein the monitoring data is associated with at least one field device.

18. The logic arrangement of claim 17, wherein the monitoring data is in an Extensible Markup Language (XML) format.

19. The logic arrangement of claim 18, wherein the first processing system uses a Simple Object Access Protocol to access a particular portion of the monitoring data from the storage arrangement.

20. The logic arrangement of claim 17, wherein the instructions, when executed by the first processing system, further configure the first processing system to transmit at least one of a request to replace the at least one field device and a recommendation for a maintenance to be performed on the at least one field device based on the monitoring data.

21. A computer-readable medium comprising and encoded with executable instructions, wherein, when the executable instructions are executed by a first processing system, the executable instructions configure the first processing system to access monitoring data from a storage arrangement of a second processing system using a Web Service, wherein the monitoring data is associated with at least one field device.

22. The computer-readable medium of claim 21, wherein the monitoring data is in an Extensible Markup Language (XML) format.

23. The computer-readable medium of claim 22, wherein the first processing system uses a Simple Object Access Protocol to access at least a particular portion of the monitoring data from the storage arrangement.

24. The computer-readable medium of claim 21, wherein, when the executable instructions are executed by the first processing system, the executable instructions further configure the first processing system to transmit at least one of a request to replace the at least one field device and a recommendation for a maintenance to be performed on the at least one field device based on the monitoring data.

25. A software arrangement encoded on a computer-readable medium comprising instructions which, when executed by a first processing system, configure the first processing system to access monitoring data from a storage arrangement of a second processing system using a Web Service, wherein the monitoring data is associated with at least one field device.

26. The software arrangement of claim 25, wherein the monitoring data is in an Extensible Markup Language (XML) format.

27. The software arrangement of claim 26, wherein the first processing system uses a Simple Object Access Protocol to access at least one particular portion of the monitoring data from the storage arrangement.

28. The software arrangement of claim 25, wherein the instructions which, when executed by the first processing system, further configure the first processing system to transmit at least one of a request to replace the at least one field device and a recommendation for a maintenance to be performed on the at least one field device based on the monitoring data.

29. A method, comprising:
   accessing monitoring data from a storage arrangement of a second processing system using a Web Service, wherein the monitoring data is associated with at least one field device; and
   transmitting at least one of a request to replace the at least one field device and a recommendation for a maintenance to be performed on the at least one field device based on the monitoring data.

30. The method of claim 29, wherein the monitoring data is in an Extensible Markup Language (XML) format.

31. The method of claim 30, wherein the accessing step comprises the step of using a Simple Object Access Protocol to access at least one particular portion of the monitoring data from the storage arrangement.

32. The method of claim 29, wherein the monitoring data includes an amount of time that the at least one field device has been in operation.

33. The method of claim 32, wherein the transmitting step comprises the step of transmitting the request to replace the at least one field device when the amount of time that the at least one field device has been in operation is greater than a predetermined amount of time.

34. The method of claim 29, wherein the at least one field device includes at least one of a temperature sensor, a pressure sensor, a flow rate sensor, a valve and a switch.

35. The method of claim 34, wherein the monitoring data includes information associated with at least one measurement performed by the at least one field device, the at least one measurement including at least one of temperature, pressure and flow rate.

36. The method of claim 35, wherein the at least one field device is communicatively coupled to a controller, and wherein the controller is communicatively coupled to the second processing system.

37. The method of claim 36, further comprising the steps of:
comparing an instantaneous temperature to an average temperature; and
transmitting the monitoring data to the second processing system when a difference between the instantaneous temperature and the average temperature is greater than a predetermined threshold.

38. The method of claim 36, further comprising the steps of:
comparing an instantaneous pressure to an average pressure; and
transmitting the monitoring data to the second processing system when a difference between the instantaneous pressure and the average pressure is greater than a predetermined threshold.

39. The method of claim 36, further comprising the steps of:
comparing an instantaneous flow rate to an average flow rate; and
transmitting the monitoring data to the second processing system when a difference between the instantaneous flow rate and the average flow rate is greater than a predetermined threshold.

40. The method of claim 34, wherein the monitoring data includes at least one of a position of the valve and a position of the switch at a plurality of times during an operation of the at least one field device.

41. The method of claim 29, wherein the at least one field device is at least one smart field device, and wherein a controller communicates with the at least one smart field device using an open smart communications protocol.

42. The method of claim 41, wherein the open smart communications protocol is a Foundation Fieldbus® protocol.

43. The method of claim 41, wherein the open smart communications protocol is a PROFIBUS® protocol.

* * * * *